Oct. 23, 1951 R. B. WOLK 2,572,417
WINDING REEL
Filed Oct. 7, 1948
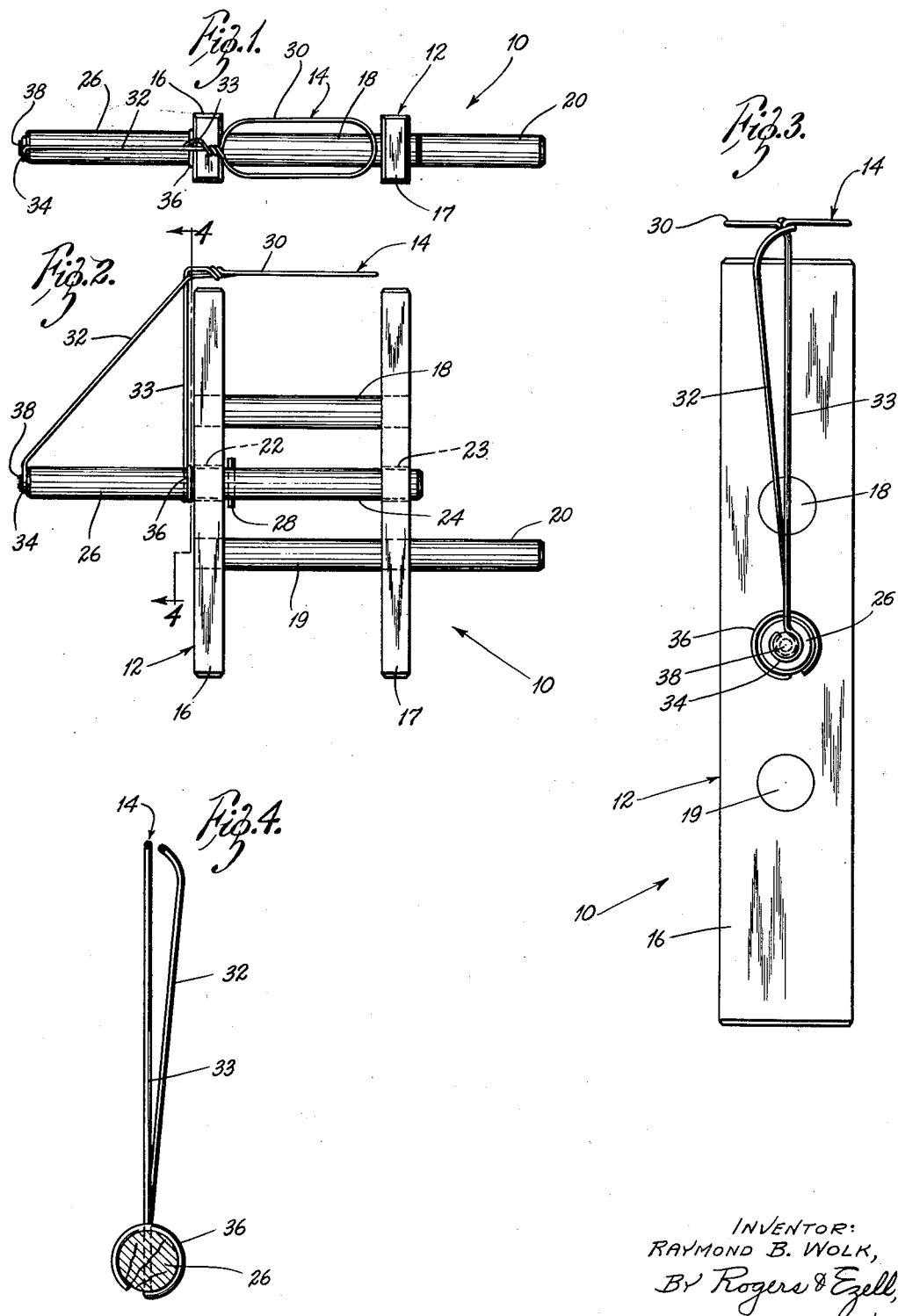
INVENTOR:
RAYMOND B. WOLK,
By Rogers & Ezell,
ATTORNEYS.

Patented Oct. 23, 1951

2,572,417

UNITED STATES PATENT OFFICE 2,572,417

WINDING REEL

Raymond B. Wolk, St. Louis, Mo.

Application October 7, 1948, Serial No. 53,158

2 Claims. (Cl. 242—100)

The present invention relates generally to portable reels, and more particularly to a hand reel for a clothes line or the like which incorporates a sturdy guide for directing the line onto the reel.

An object of the present invention is to provide a portable winding reel which incorporates a sturdy guide for directing the clothes line onto the reel.

Another object is to provide a sturdy guide for portable winding reels.

Other objects are to provide a novel guide for winding reels which is sturdy in construction, which is formed for attachment to a hand winding reel in a manner to insure long use of the device even against careless employment of the reel, which is inexpensive, and which is light in weight.

Still further objects are to provide a novel hand reel incorporating a guide for directing a line onto the reel which is sturdy in construction, which is light in weight, and which is inexpensive to manufacture.

The foregoing and other objects and advantages are apparent from the following description taken with the accompanying drawing, in which:

Fig. 1 is a plan view of a portable winding reel incorporating the teachings of the present invention;

Fig. 2 is a side elevational view thereof;

Fig. 3 is an enlarged end elevational view thereof looking from left to right in Fig. 2; and Fig. 4 is an enlarged vertical transverse cross-sectional view on substantially the line 4—4 of Fig. 2.

Referring to the drawing more particularly by reference numerals, 10 indicates generally a hand reel device constructed in accordance with the concepts of the present invention which includes a reel 12 and a line guide 14.

The reel 12 includes spaced parallel side members 16 and 17 which are secured in this relation by spaced parallel members 18 and 19 which are preferably of circular cross section. The member 19 extends beyond the side member 17 to form a hand grip 20. Aligned centrally disposed annular apertures 22 and 23 in the members 16 and 17 rotatably support a shaft 24 which extends beyond the member 16 to provide a hand grip 26. A pin 28 extends diametrically through the shaft 24 to prevent movement thereof to the left, viewing the reel 12 as shown in Fig. 2.

The guide 14 is preferably formed from a continuous piece of heavy wire twisted to the shape clearly illustrated in the drawing. The guide 14 includes a loop portion 30 and divergent supporting legs 32 and 33, the former of which terminates in a hook portion 34 and the latter in a loop portion 36 which is disposed between the leg 33 and the exterior surface of the member 16 to provide a spacer to insure freedom of contact of the leg 33 with the member 16. A headed nail 38 secures the hook portion 34 against the end of the shaft 24. The leg 33 extends diametrically through the hand grip portion 26 of the shaft 24 and is returned to provide the loop 36.

Operation

When it is desired to reel in a clothes line, or the like, one end thereof is slipped through the loop portion 30 of the guide 14 and is then secured to the shaft 24 or to either of the members 18 or 19 by a loose knot or otherwise. Thereafterwards, the line so anchored may be readily reeled in by simply holding the hand grip 26 with one hand and turning the reel 12 about the shaft 24 through application of force through grasping the hand grip 20. The clothes line will be guided onto the reel 12 about the members 18 and 19 by the loop 30 without the necessity of observing the line at any time.

It is manifest that the guide 14 is of sturdy construction and will not be displaced from its position as shown in the drawing without undue violence. The legs 32 and 33 sturdily anchor it in place. Furthermore, the mounting of the leg 33 as shown and described provides a spacing construction in the loop 36 which eliminates contact of the member 16 with the leg 33 as the reel 12 is rotated. The loop 36 also limits movement of the members 16 and 17 to the left along the shaft 24 and cooperates with the pin 28 in its function of preventing movement, as aforesaid, to the right.

The members 16, 17, 18 and 19, and the shaft 24 are preferably of light weight wood which insures a sturdy construction and yet insures a light weight article.

It is manifest that there has been provided a portable winding reel and a guide construction which fulfill the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A guide for directing a clothes line onto a hand reel comprising a loop portion, and divergent leg portions, one of said leg portions terminating in a hook portion, the other leg portion terminating in a loop portion disposed to the outside of said other leg portion and comprising a spacer, said hook portion and said loop portion being spaced from each other a substantial distance and being attachable to a shaft.

2. In combination, a portable winding reel adapted to receive a line comprising a winding axis shaft, a pair of elongated members secured to said shaft at spaced points, a pair of parallel line receiving members supported by said members at opposite sides of said winding axis shaft and parallel thereto, one of said parallel line receiving members extending outwardly beyond one member and forming a reel turning handle, said winding shaft extending outwardly beyond said other member to form a reel holding portion, and a line guide secured to said winding axis shaft including a loop portion extending across the ends of said members and a pair of legs anchored to said reel holding portion at points widely spaced axially.

RAYMOND B. WOLK.

REFERENCES CITED

The following references are of record in the file of this patent:

UNITED STATES PATENTS

| Number | Name | Date |
|---|---|---|
| 664,640 | Huebner | Dec. 25, 1900 |
| 816,328 | Holt | Mar. 27, 1906 |
| 1,014,322 | Molcar | Jan. 9, 1912 |
| 1,292,361 | Obermiller | Jan. 21, 1919 |